United States Patent
Morimoto et al.

(10) Patent No.: US 11,627,237 B2
(45) Date of Patent: Apr. 11, 2023

(54) INFORMATION PROCESSING APPARATUS AND NON-TRANSITORY COMPUTER READABLE MEDIUM OBTAINING BALANCE COMBINATION BETWEEN GRAININESS AND COLOR REPRODUCIBILITY

(71) Applicant: FUJIFILM Business Innovation Corp., Tokyo (JP)

(72) Inventors: Masashi Morimoto, Kanagawa (JP); Toshihiro Iwafuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 21 days.

(21) Appl. No.: 17/225,123

(22) Filed: Apr. 8, 2021

(65) Prior Publication Data

US 2022/0094897 A1    Mar. 24, 2022

(30) Foreign Application Priority Data

Sep. 18, 2020   (JP) .............................. JP2020-157153

(51) Int. Cl.
    *H04N 1/60*    (2006.01)
    *H04N 1/40*    (2006.01)
(52) U.S. Cl.
    CPC ....... *H04N 1/6022* (2013.01); *H04N 1/40012* (2013.01)

(58) Field of Classification Search
    CPC combination set(s) only.
    See application file for complete search history.

(56) References Cited

U.S. PATENT DOCUMENTS

| 8,441,685 | B2* | 5/2013 | Wu ..................... | H04N 1/6022 358/2.1 |
| 2002/0005965 | A1* | 1/2002 | Nagae ................. | H04N 1/6022 358/518 |
| 2007/0103708 | A1* | 5/2007 | Rozzi ................... | H04N 1/6016 358/1.9 |
| 2015/0029523 | A1* | 1/2015 | Mamura ................. | H04N 1/56 358/1.9 |

FOREIGN PATENT DOCUMENTS

JP    2007208737    8/2007

* cited by examiner

*Primary Examiner* — Barbara D Reinier
(74) *Attorney, Agent, or Firm* — JCIPRNET (57) ABSTRACT

An information processing apparatus includes a processor configured to, in accordance with a proportion of a black component with which to replace one or more non-black components that are color components other than the black component, replace the one or more non-black components with the black component for an image. The proportion of the black component is determined by brightness of the image, and when saturation of the image varies in a saturation range, the proportion decreases to a minimum value of the proportion with increasing saturation of the image and increases with increasing saturation of the image after the proportion decreases to the minimum value of the proportion.

20 Claims, 9 Drawing Sheets

PRIORITY LEVEL OF GRAININESS

| LEVEL 1 ▽ |
|---|
| LEVEL 2 |
| LEVEL 3 |
| LEVEL 4 |

FIG. 12

PRIORITY LEVEL OF GRAININESS

- ◉ LEVEL 1
- ○ LEVEL 2
- ○ LEVEL 3
- ○ LEVEL 4

INFORMATION PROCESSING APPARATUS AND NON-TRANSITORY COMPUTER READABLE MEDIUM OBTAINING BALANCE COMBINATION BETWEEN GRAININESS AND COLOR REPRODUCIBILITY

CROSS-REFERENCE TO RELATED APPLICATIONS

This application is based on and claims priority under 35 USC 119 from Japanese Patent Application No. 2020-157153 filed Sep. 18, 2020.

BACKGROUND

(i) Technical Field

The present disclosure relates to an information processing apparatus and a non-transitory computer readable medium.

(ii) Related Art

Techniques with which to replace one or more non-black components with a black component are known. A non-black component is a color component other than the black component. For example, a gray component of an area where three colors corresponding to yellow (Y), magenta (M), and cyan (C) components are superimposed is sometimes replaced with the black (K) component having a certain proportion.

Japanese Unexamined Patent Application Publication No. 2007-208737 describes a color processing method by which an input color signal defined in a device-independent color space is converted into an output color signal that depends on an output device and that includes a black signal. In the method, a black signal is determined by using the positional relationship between a black point of an output device and the input point corresponding to an input color signal in a device-independent color space, and color component signals other than the black signal are determined based on the determined black signal and the input color signal.

SUMMARY

There is usually a trade-off between graininess and color reproducibility of an image, and color reproducibility tends to decrease as graininess improves. Since such a trade-off exists, a user has difficulty in adjusting the proportion of a black component to obtain an image having good graininess, good color reproducibility, and a good tone (for example, an image having a balanced combination of graininess and color reproducibility) when one or more non-black components are replaced with the black component. To cope with such a difficulty, for example, it is possible to monotonically decrease the proportion of the black component as saturation of an image increases. Although this approach improves the graininess of the image by decreasing the proportion of the black component, the color reproducibility degrades more than necessary as the brightness decreases, leading to a deteriorated balance between graininess and color reproducibility.

Aspects of non-limiting embodiments of the present disclosure relate to making it possible to obtain an image having a more balanced combination of graininess and color reproducibility than in a case where the proportion of the black component is monotonically decreased as the saturation of the image increases when one or more non-black components, each of which is a color component other than the black component, are replaced with the black component.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in accordance with a proportion of a black component with which to replace one or more non-black components that are color components other than the black component, replace the one or more non-black components with the black component for an image. The proportion of the black component is determined by brightness of the image, and when saturation of the image varies in a saturation range, the proportion decreases to a minimum value of the proportion with increasing saturation of the image and increases with increasing saturation of the image after the proportion decreases to the minimum value of the proportion.

BRIEF DESCRIPTION OF THE DRAWINGS

An exemplary embodiment of the present disclosure will be described in detail based on the following figures, wherein.

DETAILED DESCRIPTION

Figure 1:
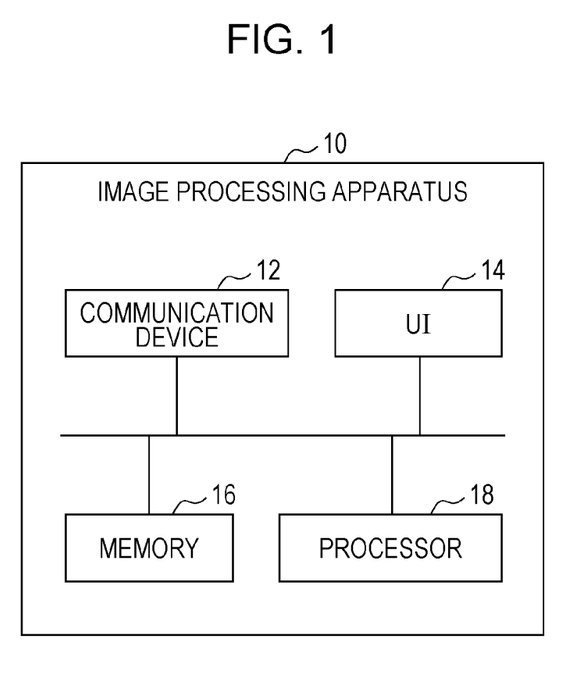
FIG. 1 is a block diagram depicting a hardware configuration of an image processing apparatus according to the present exemplary embodiment.

An image processing apparatus according to the present exemplary embodiment will be described with reference to FIG. 1. FIG. 1 depicts an example of a hardware configuration of an image processing apparatus 10 according to the present exemplary embodiment.

The image processing apparatus 10 is an example of an information processing apparatus, and examples of the image processing apparatus 10 include a workstation, a personal computer (hereinafter, referred to as a "PC"), a tablet PC, a smartphone, and other apparatuses (such as a printer, a scanner, and a multifunction peripheral including a printer and a scanner). Alternatively, the image processing apparatus 10 may be built into an apparatus such as a printer or a multifunction peripheral.

The image processing apparatus 10 accepts image data, for example, via a communication path such as the Internet or a local area network (LAN), an external apparatus, or a recording medium, performs image processing on the accepted image data, and outputs image data that has undergone the image processing. The image data that has undergone the image processing may be output, for example, to a printer or a multifunction peripheral for printing, to a display for presentation, or to a memory of the image processing apparatus 10 or a memory of an external apparatus for storage.

In the following description, image data that is input into the image processing apparatus 10 (in other words, image data accepted by the image processing apparatus 10) is referred to as "input image data", and image data that is output from the image processing apparatus 10 is referred to as "output image data".

Input image data and output image data are each a color signal representing a combination of a plurality of color components. For example, input image data and output image data are each a color signal representing a combination of a black (K) component, which represents the color black, and one or more non-black components, each of which is a color component other than the K component. The one or more non-black components are represented by a combination of, for example, a cyan (C) component, a magenta (M) component, and a yellow (Y) component. In other words, input image data and output image data are each a CMYK color signal that represents a combination of the C component, the M component, the Y component, and the K component. The one or more non-black components described above are only an example and may include the CMY components and other color components or include color components other than the CMY components.

Image data, which is an RGB color signal representing a combination of a red (R) component, a green (G) component, and a blue (B) component, may be input into the image processing apparatus 10, and the image processing apparatus 10 may convert the RGB color signal into a CMYK color signal. In this case, the CMYK color signal, which is obtained by the conversion, is treated as input image data. For example, when image data represented by an RGB color signal is printed, such a color conversion is performed. In more detail, the image processing apparatus 10 accepts image data that is to be printed and that is represented by an RGB color signal, converts the RGB color signal into a color signal (for example, a CMYK color signal) in a color space that depends on a device, which is a printer, (for example, the color space specified by the CMYK components), and outputs to the printer converted image data. The printer prints the converted image data.

As depicted in FIG. 1, the image processing apparatus 10 includes, for example, a communication device 12, a user interface (UI) 14, a memory 16, and a processor 18.

The communication device 12 is a communication interface including a communication chip, a communication circuit, and other components and has a function of transmitting information to other apparatuses and a function of receiving information transmitted from other apparatuses. Communication performed by the communication device 12 may be wireline communication or wireless communication.

The UI 14 is a user interface and includes a display and an operation device. Examples of the display include a liquid crystal display and an electroluminescence (EL) display. Examples of the operation device include a keyboard, input keys, a mouse, and an operation panel. The UI 14 may be a UI such as a touch panel, which combines a display and an operation device.

The memory 16 is a device constituting one or more memory regions that store various kinds of information. Examples of the memory 16 include a hard disk drive, various kinds of memories (for example, a random-access memory (RAM), a dynamic RAM (DRAM), and a read-only memory (ROM)), other storage devices (for example, an optical disc), and a combination of these components. One or more memories are included in the image processing apparatus 10 as the memory 16.

The processor 18 is configured so as to control the operation of each unit of the image processing apparatus 10. The processor 18 may include a memory.

The processor 18 is configured to replace one or more non-black components in input image data with the K component. For example, the processor 18 executes gray component replacement (GCR) processing. In the GCR processing, a certain proportion of a gray component is replaced with the K component in a region where the three colors corresponding to the CMY components are superimposed in input image data. The processor 18 outputs as output image data image data that has undergone the GCR processing.

A parameter minK is defined as the smallest amount of the K component required to reproduce by using GCR processing a target color expressed by the CMY components, and a parameter maxK is defined as the largest amount of the K component capable of reproducing the target color. The parameters minK and maxK may be determined in advance by a person such as an administrator. Alternatively, maxK may be defined as the amount of the K component required to reproduce a target color expressed by the CMY components while the amount of one color component of the CMY components is kept at zero.

The processor 18 replaces a gray component in a region where the three colors corresponding to the CMY components are superimposed in input image data with the K component having an amount ranging from minK to maxK.

The amount of the K component used for replacement is determined by a GCR rate. A GCR rate is a proportion of the K component when the CMY components are replaced with the K component and ranges for example, from 0% to 100%.

Multiplying maxK by a GCR rate provides the amount of the K component used for replacement. If the GCR rate is 100%, the amount of the K component used for replacement is maxK. If the GCR rate is 0%, the CMY components are not replaced with the K component. The processor 18 may determine the amount of the K component by using the GCR rate. The amount of the K component based on the GCR rate may be determined in advance. Information indicating the GCR rate is stored in the memory 16 in advance.

A GCR rate depends on brightness and saturation. A GCR rate may be a function that specifies a proportion of the K component by using brightness and saturation as variables.

When saturation varies in a saturation range, a GCR rate, which is determined for each value of brightness, decreases to a minimum value of the GCR rate with increasing saturation and increases with increasing saturation after the GCR rate decreases to the minimum value of the GCR rate. For example, for a given value of brightness, a GCR rate decreases to a minimum value of the GCR rate with increasing saturation and increases with increasing saturation after the GCR rate decreases to the minimum value of the GCR rate. In addition, a GCR rate increases as brightness decreases.

The processor 18 accepts input image data, which is a CMYK color signal, and creates output image data by replacing the CMY components with an amount of the K component corresponding to a proportion determined by a GCR rate. For example, for each pixel of input image data, the processor 18 determines a GCR rate corresponding to the brightness and saturation of the input image data, calculates an amount of the K component by multiplying maxK by the determined GCR rate, and replaces the CMY components with the K component having the amount determined in this way.

In a case where image data that is an RGB color signal is input into the image processing apparatus 10, the processor 18 may create output image data by converting the image data into image data expressed by a CMYK color signal (for example, image data specified in a color space that depends on a printer to which the image data is output) and by executing GCR processing by using as input image data the image data obtained by the conversion.

Processing performed by the image processing apparatus 10 will be described in detail based on a specific example below.

Figure 2:
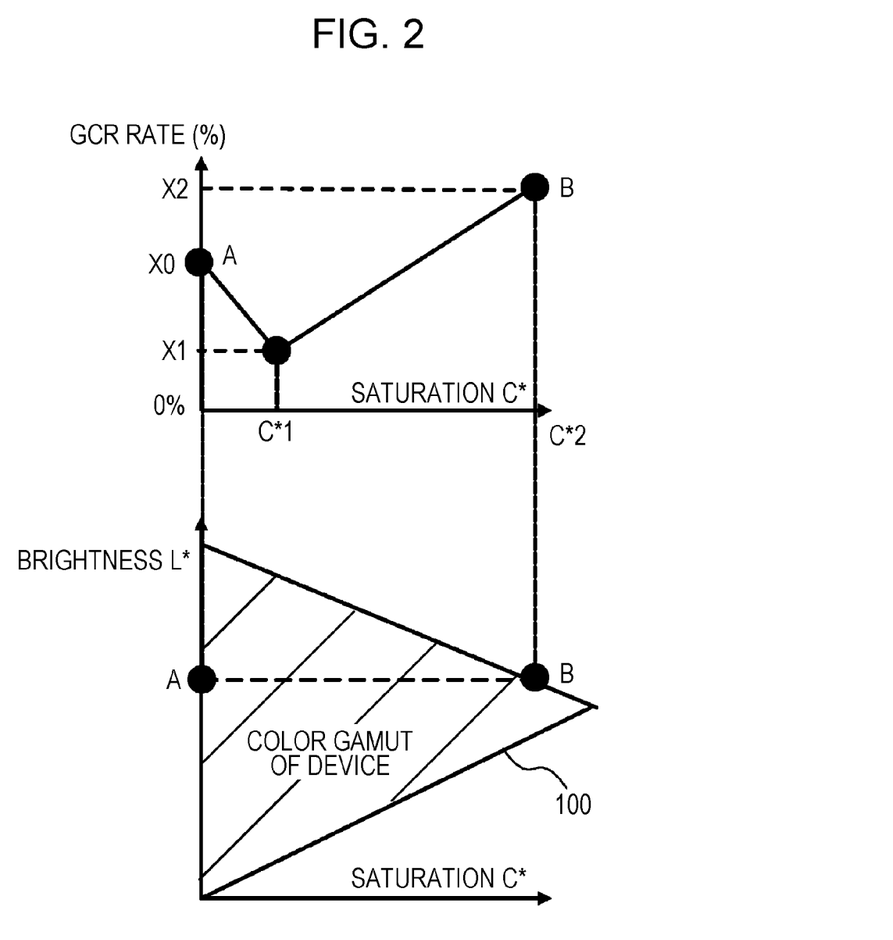
FIG. 2 is an illustration depicting a gray component replacement (GCR) rate as a function of saturation.

An example of a GCR rate will be described with reference to FIG. 2. FIG. 2 depicts a correspondence between saturation C* and a GCR rate (namely, a proportion of the K component) for a certain value of brightness L*. In the graph presenting the correspondence between saturation C* and the GCR rate, the horizontal axis represents saturation C*, and the vertical axis represents the GCR rate (0% to 100%).

FIG. 2 also depicts a color gamut 100 of a device. For example, output image data is output to this device. The color gamut 100 of the device is defined in terms of saturation C* and brightness L*. The point A in FIG. 2 indicates a point at which saturation C* becomes zero for a value of brightness L*. The point B indicates a point at which saturation C* becomes highest while the same value of brightness L* is maintained. The points A and B in the color gamut 100 of the device correspond to the points A and B, respectively, in the graph presenting the correspondence between saturation C* and the GCR rate.

In the graph presenting the correspondence between saturation C* and the GCR rate with the horizontal axis representing saturation C* and the vertical axis representing the GCR rate, a line representing the GCR rate is bowed downward. The line has a shape formed of straight lines, curves, or a combination of straight lines and curves. The GCR rate will be described in detail below.

For example, if saturation C* is zero (that is, the saturation C* at the point A), the GCR rate takes a value X0, which is larger than 0%. If saturation C* takes a value C*1, the GCR rate takes a value X1, which is a minimum value. The value X1 is equal to or larger than 0%. The GCR rate decreases as saturation C* increases from zero to the value C*1. For saturation C* higher than C*1, the GCR rate increases as saturation C* increases. A saturation value C*2 (that is, the saturation C* at the point B) is the highest saturation while the same value of brightness L* is maintained, and a value X2 is the GCR rate when saturation C* is equal to C*2. The saturation value C*1 at which the GCR rate takes the minimum value is located between the saturation C* equal to zero and the saturation value C*2 (in other words, between the point A and the point B). The value X1 is smaller than the value X0 and the value X2.

The values X0 and X1, the saturation value C*1 at which the GCR rate takes the minimum value, and the slope of the graph may change in accordance with brightness L*. In addition, the values X0, X1, and X2 and the saturation value C1* may be changed by a user.

FIG. 2 depicts a graph of the GCR rate for a certain value of brightness L*, and graphs of GCR rates for other values of brightness L* also have a shape similar to the shape of the graph of the GCR rate depicted in FIG. 2 (that is, being bowed downward).

For example, for each value of brightness L*, a correspondence between saturation C* and a GCR rate is determined, and information indicating the correspondence for each value of brightness L* is stored in the memory 16 in advance. In addition, the GCR rate increases as brightness L* decreases.

The processor 18 accepts input image data, determines for each pixel a GCR rate corresponding to the value of saturation C* in accordance with the correspondence between saturation C* and the GCR rate for the value of brightness L*, and calculates an amount of the K component by multiplying maxK by the determined GCR rate. The processor 18 replaces a gray component in a region where the three colors corresponding to the CMY components are superimposed in the input image data with the calculated amount of the K component. Output image data is created in this way.

In the present exemplary embodiment, the GCR rate decreases as saturation C* increases from zero to the value C*1, and the GCR rate takes a minimum value at the saturation value C*1. For saturation C* higher than C*1, the GCR rate increases as saturation C* increases. In contrast to the method according to the present exemplary embodiment, it is possible to monotonically decrease a GCR rate as saturation C* increases as in a method according to a comparative example. However, in the method according to the comparative example, the color gamut in a low brightness region narrows, sometimes degrading, for example, the impression of natural landscape. In the method according to the present exemplary embodiment, the color gamut becomes wider, the color reproducibility in a low brightness region becomes better, and the gradation become better than in the method according to the comparative example.

The processor 18 may change a minimum value of a GCR rate in accordance with the priority level of graininess of image data. Specifically, the processor 18 decreases or increases a minimum value of a GCR rate in accordance with the priority level of graininess. The priority level of graininess is specified, for example, by the user. For example, the priority level of graininess of an image to be obtained by printing output image data is specified by the user. The processor 18 changes the minimum value in accordance with the specified priority level. For example, the processor 18 decreases the minimum value of the GCR rate as the priority level of graininess increases.

Figure 3:
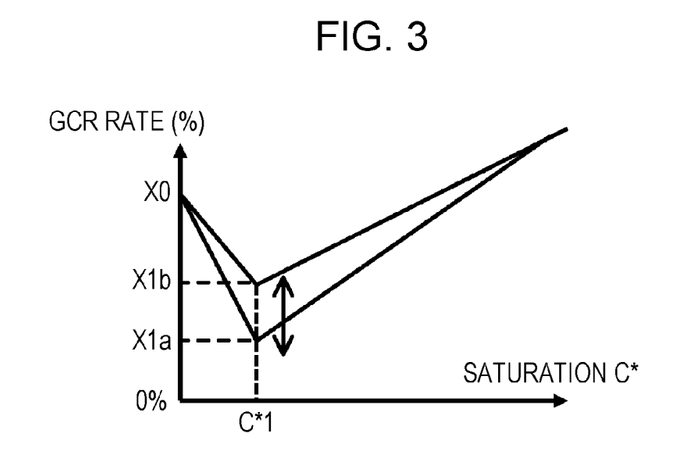
FIG. 3 is an illustration depicting a GCR rate as a function of saturation.

A process of changing a minimum value of a GCR rate in accordance with the priority level of graininess will be described below with reference to FIG. 3. FIG. 3 depicts a relationship between saturation C* and a GCR rate for a certain value of brightness L*. In FIG. 3, the horizontal axis represents saturation C*, and the vertical axis represents the GCR rate (0% to 100%).

The processor 18 increases or decreases a minimum value of a GCR rate in accordance with the priority level of graininess specified by the user. A value X1$a$ is the minimum value of the GCR rate when the priority level of graininess is highest. A value X1$b$ is the minimum value of the GCR rate when the priority level of graininess is lowest. The processor 18 varies the minimum value of the GCR rate between the value X1$a$ and the value X1$b$ in accordance with the priority level of graininess.

For example, the processor 18 only varies the minimum value of the GCR rate without changing the saturation value C*1. In response to this change, the slope of the GCR rate between the value X0, which is the GCR rate when saturation C* is zero, and the minimum value of the GCR rate changes. In addition, the slope of the GCR rate for saturation C* higher than C*1 changes.

The processor 18 creates output image data by executing GCR processing on input image data in accordance with a GCR rate graph that has a minimum value determined based on the priority level of graininess.

In general, the graininess of an image improves (for example, the image becomes less grainy) as the amount of the K component decreases. As the priority level of graininess increases, a minimum value of a GCR rate is decreased, leading to a decrease in the amount of the K component, and thus an image having good graininess is obtained.

For each priority level of graininess, a minimum value of a GCR rate and a GCR rate graph having the minimum value may be determined in advance and stored in the memory 16 in advance. The processor 18 executes GCR processing in accordance with the GCR rate stored in the memory 16.

The processor 18 may decrease or increase a GCR rate in the entire saturation range in accordance with the priority level of color reproducibility of image data. The priority level of color reproducibility is specified, for example, by the user. For example, the priority level of color reproducibility of an image to be obtained by printing output image data is specified by the user. The processor 18 changes a GCR rate in accordance with the specified priority level. For example, the processor 18 increases a GCR rate in the entire saturation range as the priority level of color reproducibility increases.

Figure 4:
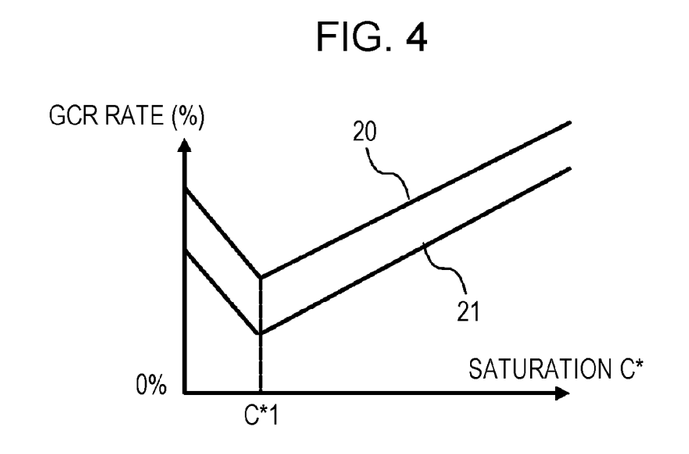
FIG. 4 is an illustration depicting a GCR rate as a function of saturation.

A process of changing a GCR rate in accordance with the priority level of color reproducibility will be described below with reference to FIG. 4. FIG. 4 depicts a relationship between saturation C* and a GCR rate for a certain value of brightness L*. In FIG. 4, the horizontal axis represents saturation C*, and the vertical axis represents the GCR rate (0% to 100%).

The processor 18 moves upward or downward the entire graph representing the GCR rate in accordance with the priority level of color reproducibility specified by the user. A graph 20 of a GCR rate represents a GCR rate graph when the priority level of color reproducibility is highest. A graph 21 of a GCR rate represents a GCR rate graph when the priority level of color reproducibility is lowest. The processor 18 moves upward or downward a GCR rate graph between the graph 20 and the graph 21 in accordance with the priority level of color reproducibility. The slope of each graph does not change if the priority level of color reproducibility is changed. Namely, the processor 18 translates upward or downward a GCR rate graph in accordance with the priority level of color reproducibility. The processor 18 does not change the saturation value C*1 at which the GCR rate takes a minimum value.

The processor 18 creates output image data by executing GCR processing on input image data in accordance with a GCR rate graph determined based on the priority level of color reproducibility.

In general, the color reproducibility of an image improves as the amount of the K component increases. As the priority level of color reproducibility increases, the entire graph of a GCR rate is moved upward, leading to an increase in the amount of the K component, and thus an image having good color reproducibility is obtained.

For each priority level of color reproducibility, a GCR rate graph may be determined in advance and stored in the memory 16 in advance. The processor 18 executes GCR processing in accordance with a GCR rate stored in the memory 16.

The processor 18 may change a GCR rate in accordance with both the priority level of graininess and the priority level of color reproducibility. Specifically, the processor 18 varies a minimum value of a GCR rate in accordance with the priority level of graininess and moves upward or downward a GCR rate in the entire saturation range in accordance with the priority level of color reproducibility.

The processor 18 may change the saturation value at which a GCR rate reaches a minimum in accordance with a hue of image data. The processor 18 may change the saturation value at which a GCR rate reaches a minimum in accordance with an object (for example, a person or the sky) represented by image data. This process will be described below.

Figure 5:
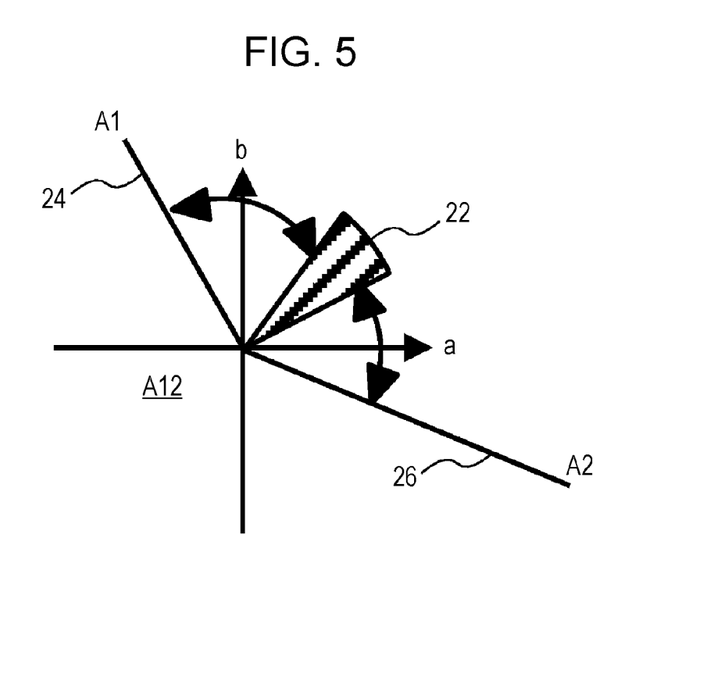
FIG. 5 is an illustration for describing a hue.

FIG. 5 depicts an example of a color space. FIG. 5 depicts the a*b* plane in the L*a*b* space. A symbol 22 indicates a hue range of 50 to 80° and corresponds to, for example, a hue of a human skin.

Figure 6:
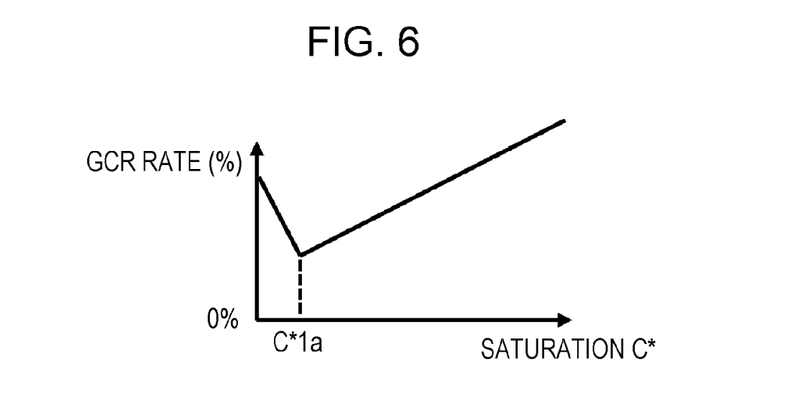
FIG. 6 is an illustration depicting a GCR rate as a function of saturation.

FIG. 6 depicts a GCR rate for a hue in the range of 50 to 80°. The value of saturation C* at which the GCR rate reaches a minimum is C*1$a$. For example, the saturation value C*1$a$ is 10.

Figure 7:
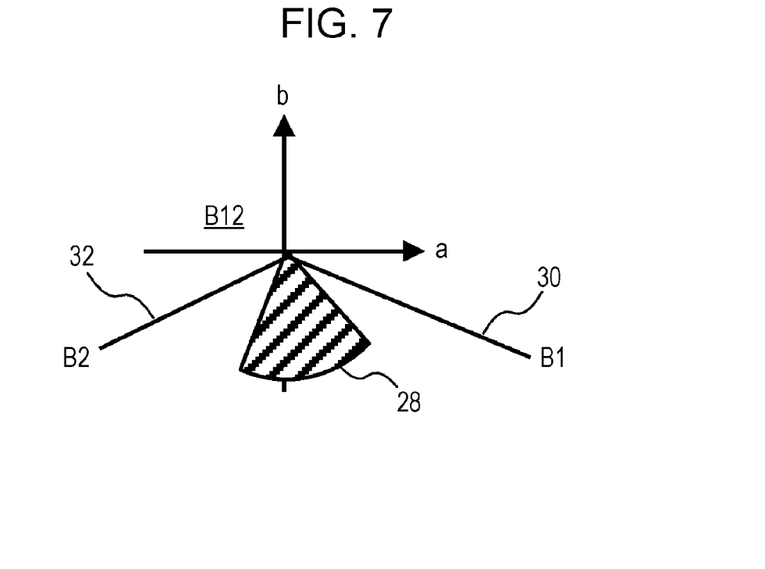
FIG. 7 is an illustration for describing a hue.

FIG. 7 depicts an example of a color space. FIG. 7 depicts the a*b* plane in the L*a*b* space. A symbol 28 indicates a hue range of 260 to 300° and corresponds to, for example, a hue of the sky.

Figure 8:
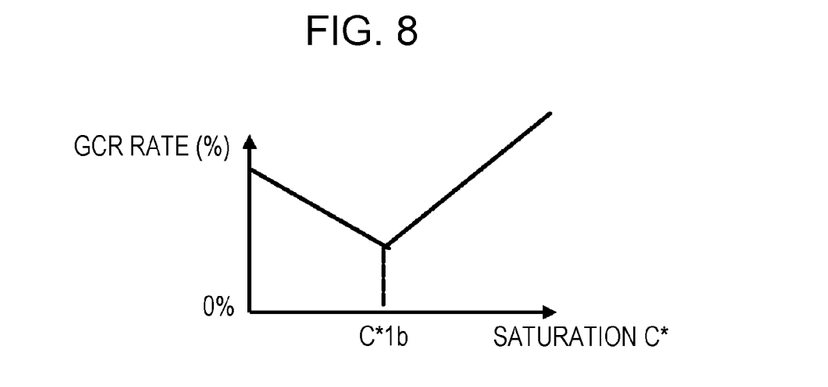
FIG. 8 is an illustration depicting a GCR rate as a function of saturation.

FIG. 8 depicts a GCR rate for a hue in the range of 260 to 300°. The value of saturation C* at which the GCR rate reaches a minimum is C*1$b$. For example, the saturation value C*1$b$ is 40.

The processor 18 may change a minimum value of a GCR rate in accordance with a hue or may maintain a minimum value of a GCR rate irrespective of a hue. For example, the minimum value of the GCR rate at the saturation value C*1$a$ and the minimum value of the GCR rate at the saturation value C*1$b$ may be the same or different.

For example, as a value of a hue increases, the processor 18 increases the value of saturation C* at which a GCR rate takes a minimum value. As depicted in FIGS. 6 and 8, the saturation value C*1$b$ is higher than the saturation value C*1$a$.

For example, a GCR rate is determined so as to take a minimum value at low saturation for a hue in the range of 50 to 80° so that a color of a human skin represented by image data appears more genuine. Further, a GCR rate is determined so as to take a minimum value at high saturation for a hue in the range of 260 to 300° to improve the graininess of the sky represented by image data.

The processor 18 creates output image data by changing a GCR rate in accordance with the hue of an object represented by input image data and by executing GCR processing on the input image data. For example, the processor 18 uses the GCR rate depicted in FIG. 6 to execute GCR processing on an object having a hue in the range of 50 to 80° and uses the GCR rate depicted in FIG. 8 to execute GCR processing on an object having a hue in the range of 260 to 300°.

Alternatively, the user may specify an object (for example, a human face or the sky) represented by output image data. The processor 18 executes GCR processing in accordance with a GCR rate corresponding to the hue of the specified object.

Further, a reference value of saturation at which a GCR rate reaches a minimum may be determined in advance for a reference hue determined in advance. The saturation value at which a GCR rate reaches a minimum for a hue in the range of 50 to 80° and the saturation value at which a GCR rate reaches a minimum for a hue in the range of 260 to 300° are changed from this reference value of saturation.

When the saturation value at which a GCR rate reaches a minimum is changed for a specific hue (for example, a hue in the range of 50 to 80° or a hue in the range of 260 to 300°), for a hue between the specific hue and the reference hue, the processor 18 may change in accordance with the hue the saturation value at which a GCR rate reaches a minimum. For example, the processor 18 gradually or in a stepwise manner changes the saturation value at which a GCR rate reaches a minimum as a hue changes from the specific hue to the reference hue so that the saturation value at which a GCR rate reaches a minimum becomes equal to the reference value of saturation when the hue is equal to the reference hue. The change may be a linear one or a non-linear one. This process will be described below with reference to FIGS. 5 and 7.

In FIG. 5, the hue range of 50 to 80° indicated by the symbol 22 is the specific hue described above. The hue A1 indicated by a symbol 24 and the hue A2 indicated by a symbol 26 are each the reference hue described above. The saturation value at which a GCR rate reaches a minimum for the hues A1 and A2, which are each the reference hue, is the reference value of saturation described above. For example, the reference value of saturation C* is 30.

As a hue changes from the hue 50° to the hue A1, the saturation value at which a GCR rate reaches a minimum is gradually or in a stepwise manner changed so that the saturation value at which a GCR rate reaches a minimum becomes equal to 30 when the hue is equal to A1. Similarly, as a hue changes from the hue 80° to the hue A2, the saturation value at which a GCR rate reaches a minimum is gradually or in a stepwise manner changed so that the saturation value at which a GCR rate reaches a minimum becomes equal to 30 when the hue is equal to A2. In a hue range of the hue A1 to the hue A2 that does not include the hue range of 50 to 80° (a hue range A12 in FIG. 5), the saturation value at which a GCR rate reaches a minimum is equal to the reference value of saturation.

In FIG. 7, the hue range of 260 to 300° indicated by the symbol 28 is the specific hue described above. The hue B1 indicated by a symbol 30 and the hue B2 indicated by a symbol 32 are each the reference hue described above. The saturation value at which a GCR rate reaches a minimum for the hues B1 and B2, which are each the reference hue, is the reference value of saturation described above. For example, the reference value of saturation C* is 30.

As a hue changes from the hue 260° to the hue B1, the saturation value at which a GCR rate reaches a minimum is gradually or in a stepwise manner changed so that the saturation value at which a GCR rate reaches a minimum becomes equal to 30 when the hue is equal to B1. Similarly, as a hue changes from the hue 300° to the hue B2, the saturation value at which a GCR rate reaches a minimum is gradually or in a stepwise manner changed so that the saturation value at which a GCR rate reaches a minimum becomes equal to 30 when the hue is equal to B2. In a hue range of the hue B1 to the hue B2 that does not include the hue range of 260 to 300° (a hue range B12 in FIG. 7), the saturation value at which a GCR rate reaches a minimum is equal to the reference value of saturation.

The reference hue, the reference value of saturation at which a GCR rate reaches a minimum for the reference hue, the minimum value of a GCR rate at the reference value of saturation, and a characteristic of a change in the saturation value at which a GCR rate reaches a minimum (for example, the rate of change) between the specific hue and the reference hue, all of which are described above, may be changed by the user.

Figure 9:
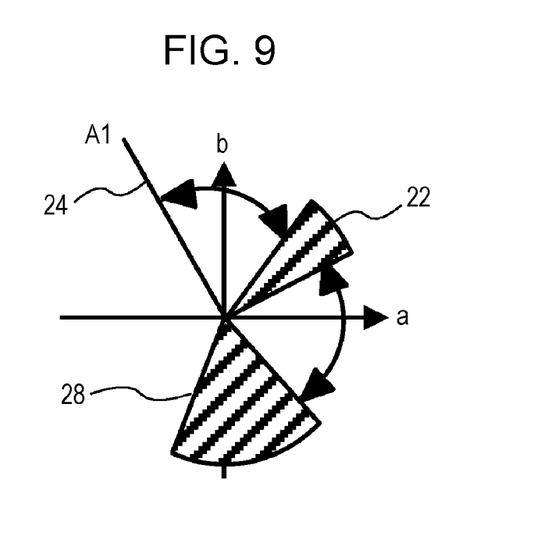
FIG. 9 is an illustration for describing a hue.

A plurality of hue ranges may be specified as the specific hue. As depicted in FIG. 9, for example, the hue range of 50 to 80° indicated by the symbol 22 and the hue range of 260 to 300° indicated by the symbol 28 are specified as the specific hue. In this case, the processor 18 gradually or in a stepwise manner changes the saturation value at which a GCR rate reaches a minimum as a hue changes from 80° to 260°. In addition, as described above, the processor 18 gradually or in a stepwise manner changes the saturation value at which a GCR rate reaches a minimum as a hue changes from 50° to the hue A1.

The processor 18 may also change a GCR rate in accordance with a hue and at least one of the priority levels of graininess and color reproducibility. For example, the processor 18 may vary a minimum value of a GCR rate in accordance with the priority level of graininess, move upward or downward a GCR rate in the entire saturation range in accordance with the priority level of color reproducibility, and further change the value of saturation C* at which a GCR rate reaches a minimum in accordance with a hue. In a process of this case, a GCR rate may naturally be changed in accordance with either the priority level of graininess or the priority level of color reproducibility at the same time as the GCR rate is changed in accordance with a hue.

User interfaces for configuring various settings will be described below. The user interfaces described below are presented, for example, by a display of the image processing apparatus 10 or by a display of a user terminal apparatus. The user configures settings by operating the presented user interfaces. The processor 18 executes GCR processing in accordance with the settings.

Figure 10:
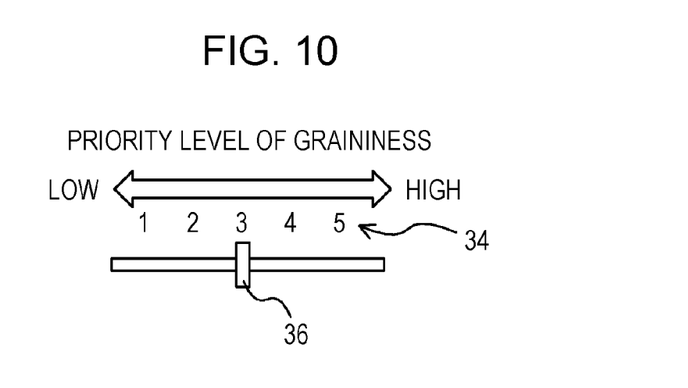
FIG. 10 is an illustration depicting a user interface with which to set a priority level of graininess.

FIG. 10 depicts an example of a user interface with which to set a priority level of graininess. The user interface depicted in FIG. 10 is a slider. The user interface includes, for example, gradations 34 indicating priority levels (for example, five priority levels) and a slider knob 36. The user specifies a priority level of graininess by operating the slider knob 36.

Figure 11:
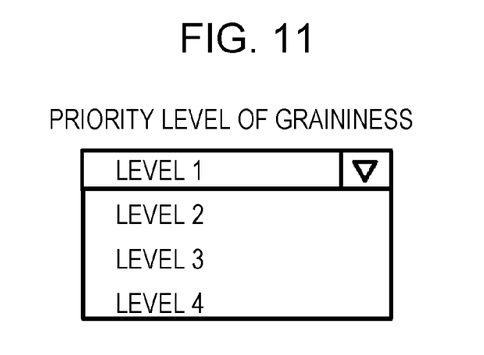
FIG. 11 is an illustration depicting a user interface with which to set a priority level of graininess.

FIG. 11 depicts another example of a user interface with which to set a priority level of graininess. The user interface depicted in FIG. 11 is a user interface of a pull-down type. For example, priority levels of graininess are presented (for example, levels 1 to 4), and the user specifies a level to be assigned to the priority.

Figure 12:
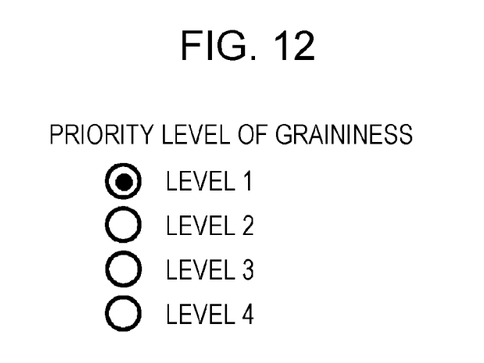
FIG. 12 is an illustration depicting a user interface with which to set a priority level of graininess.

FIG. 12 depicts still another example of a user interface with which to set a priority level of graininess. The user interface depicted in FIG. 12 includes radio buttons. For example, priority levels of graininess are presented (for example, levels 1 to 4), and the user specifies a level by pressing one of the buttons.

While the user interfaces for setting a priority level of graininess are presented in FIGS. 10 to 12, the user interfaces depicted in FIGS. 10 to 12 each may be used as a user interface for setting a priority level of color reproducibility.

Figure 13:
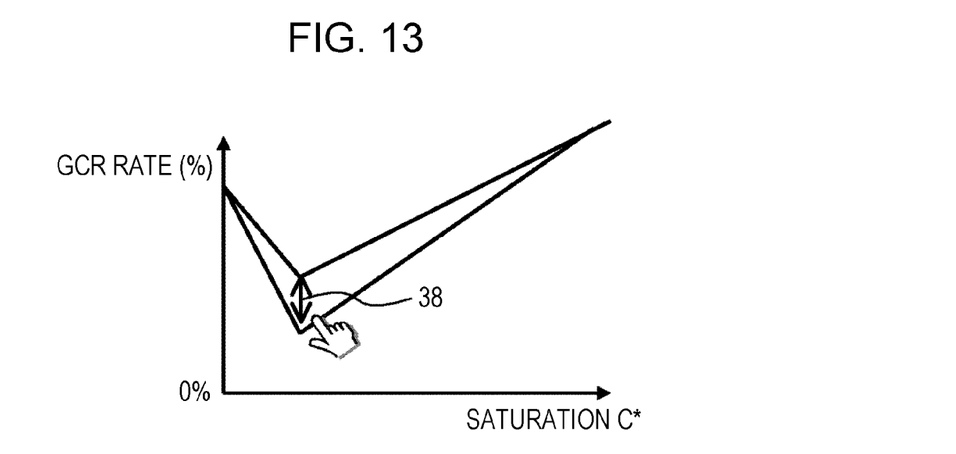
FIG. 13 is an illustration depicting a user interface with which to set a GCR rate.

FIG. 13 depicts an example of a user interface with which to set a GCR rate. For example, a graph of a GCR rate as a function of saturation C* is presented by a display, and the user changes a minimum value of the GCR rate on a screen of the display as indicated by a symbol 38. The slope of the GCR rate is also changed as the minimum value of the GCR rate is changed. In addition, the value of saturation C* at which the GCR rate takes the minimum value may be changed by the user.

Figure 14:
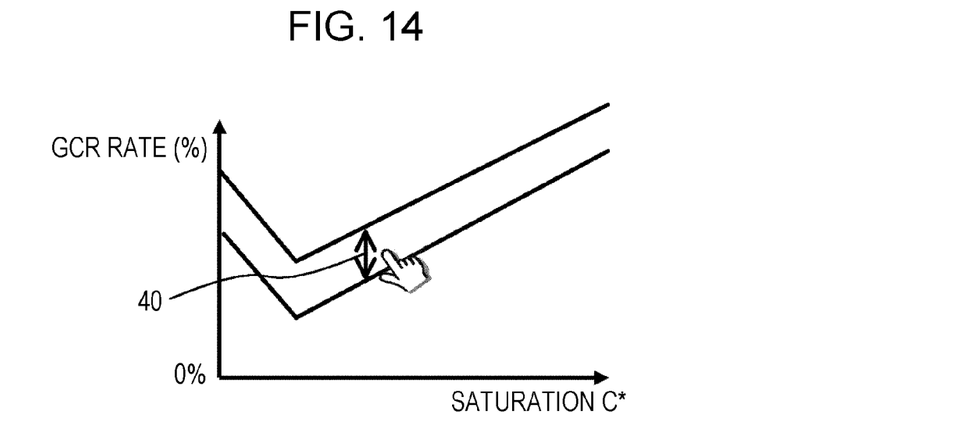
FIG. 14 is an illustration depicting a user interface with which to set a GCR rate.

FIG. 14 depicts another example of a user interface with which to set a GCR rate. For example, a graph of a GCR rate as a function of saturation C* is presented by the display, and the user moves upward and downward the GCR rate in the entire saturation range on the screen of the display as indicated by a symbol 40. In this case, the slope of the GCR rate is not changed. Although the GCR rate in the entire saturation range is moved upward or downward while the value of saturation C* at which the GCR rate takes the minimum value is fixed in the example depicted in FIG. 14, the value of saturation C* at which the GCR rate takes the minimum value may be changed by the user.

In addition, in response to a value of brightness L* being specified by the user, a graph representing a correspondence between saturation C* and a GCR rate for the value of brightness L* may be presented by the display. For example, the graphs are depicted in FIGS. 13 and 14 for a certain value of brightness L*. In response to a value of brightness L* being changed by the user, a graph for the value of brightness L* subjected to the change is presented, and the user can operate the graph to change the minimum value of the GCR rate or move upward or downward the GCR rate in the entire saturation range.

In addition to the user interface depicted in FIG. 13 or FIG. 14, the processor 18 may cause the display to present an output image based on output image data subjected to GCR processing. For example, if a GCR rate is set by the user, who uses the user interface depicted in FIG. 13 or FIG. 14, the processor 18 executes GCR processing on input image data in accordance with the GCR rate that has been set and thus creates output image data. The processor 18 causes the display to present an output image based on the output image data. The processor 18 may also cause the display to present an input image, which is based on the input image data, and the output image side by side.

Figure 15:
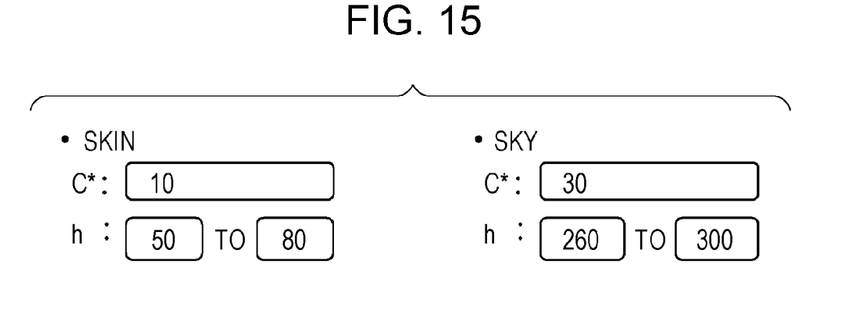
FIG. 15 is an illustration depicting a user interface with which to set saturation and a hue.

FIG. 15 depicts an example of a user interface with which to set saturation C* and a hue h. Here, as an example, a user interface with which to set a value of saturation C* and a value of a hue h for each of the objects "skin" and "sky" is presented. The value of saturation C* set here is a value of saturation C* at which a GCR rate takes a minimum value, and the value of a hue h is a value of a hue to which the value of saturation C* is applied. In the specific example depicted here, for the object "skin", a value of saturation C* is set to "10", and a value of a hue is set to "50 to 80°". In this way, a value of saturation C* at which the GCR rate takes a minimum value is set to "10", and a value of a hue to which the value of saturation C* is applied is set to "50 to 80°". A similar procedure is performed for the object "sky". These values are entered by the user.

Figure 16:
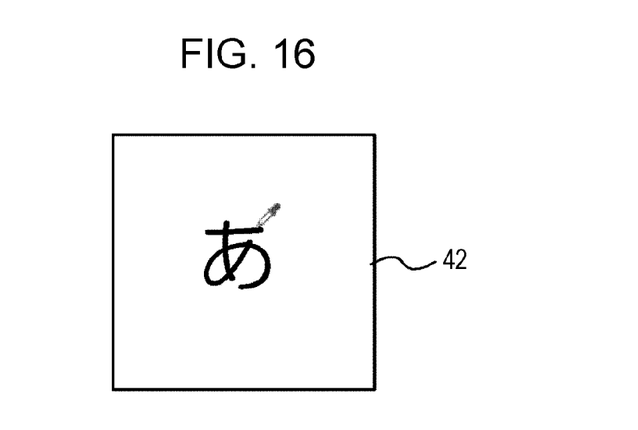
FIG. 16 is an illustration depicting a user interface with which to set saturation and a hue.

FIG. 16 depicts an example of a user interface with which to set saturation C* and a hue h. For example, an input image 42 based on input image data is presented by the display. If the user specifies a pixel in the input image 42 on the screen of the display, the processor 18 acquires RGB values of the specified pixel (for example, 255, 243, and 255) from the input image data. Next, the processor 18 converts the acquired RGB values into L*a*b* values, which are values in a standard color space, and calculates a value of saturation C* and a value of a hue h. The calculated values of saturation C* and a hue h are the values of saturation C* and a hue h of the pixel specified by the user.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
  a processor configured to
    in accordance with a proportion of a black component with which to replace one or more non-black components that are color components other than the black component, replace the one or more non-black components with the black component for an image, and
    determine the proportion of the black component by brightness of the image and when saturation of the image varies in a saturation range from a first point to a second point, the proportion decreases from the first point to a minimum value of the proportion with increasing saturation of the image and increases with increasing saturation of the image after the proportion decreases to the minimum value of the proportion to the second point, wherein the first point indicates a point at which saturation of the image becomes zero for a value of brightness, the second point indicates a point at which saturation of the image becomes highest while the same value of brightness is maintained.

2. The information processing apparatus according to claim 1,
wherein the processor is further configured to
change the minimum value of the proportion of the black component in accordance with a priority level of graininess of the image.

3. The information processing apparatus according to claim 2,
wherein the processor is configured to
decrease the minimum value of the proportion of the black component as the priority level of graininess of the image increases.

4. The information processing apparatus according to claim 1,
wherein the processor is further configured to
decrease or increase the proportion of the black component in the entire saturation range in accordance with a priority level of color reproducibility of the image.

5. The information processing apparatus according to claim 2,
wherein the processor is further configured to
decrease or increase the proportion of the black component in the entire saturation range in accordance with a priority level of color reproducibility of the image.

6. The information processing apparatus according to claim 3,
wherein the processor is further configured to
decrease or increase the proportion of the black component in the entire saturation range in accordance with a priority level of color reproducibility of the image.

7. The information processing apparatus according to claim 4,
wherein the processor is configured to
increase the proportion of the black component in the entire saturation range as the priority level of color reproducibility of the image increases.

8. The information processing apparatus according to claim 5,
wherein the processor is configured to
increase the proportion of the black component in the entire saturation range as the priority level of color reproducibility of the image increases.

9. The information processing apparatus according to claim 6,
wherein the processor is configured to
increase the proportion of the black component in the entire saturation range as the priority level of color reproducibility of the image increases.

10. The information processing apparatus according to claim 1,
wherein the processor is further configured to
change, in accordance with a hue of the image, a value of saturation at which the proportion of the black component reaches the minimum value.

11. The information processing apparatus according to claim 2,
wherein the processor is further configured to
change, in accordance with a hue of the image, a value of saturation at which the proportion of the black component reaches the minimum value.

12. The information processing apparatus according to claim 3,
wherein the processor is further configured to
change, in accordance with a hue of the image, a value of saturation at which the proportion of the black component reaches the minimum value.

13. The infoiination processing apparatus according to claim 4,
wherein the processor is further configured to
change, in accordance with a hue of the image, a value of saturation at which the proportion of the black component reaches the minimum value.

14. The information processing apparatus according to claim 5,
wherein the processor is further configured to
change, in accordance with a hue of the image, a value of saturation at which the proportion of the black component reaches the minimum value.

15. The information processing apparatus according to claim 6,
wherein the processor is further configured to
change, in accordance with a hue of the image, a value of saturation at which the proportion of the black component reaches the minimum value.

16. The information processing apparatus according to claim 7,
wherein the processor is further configured to
change, in accordance with a hue of the image, a value of saturation at which the proportion of the black component reaches the minimum value.

17. The information processing apparatus according to claim 8,
wherein the processor is further configured to
change, in accordance with a hue of the image, a value of saturation at which the proportion of the black component reaches the minimum value.

18. The information processing apparatus according to claim 9,
wherein the processor is further configured to
change, in accordance with a hue of the image, a value of saturation at which the proportion of the black component reaches the minimum value.

19. The information processing apparatus according to claim 10,
wherein a reference value of saturation at which the proportion of the black component reaches the minimum value is determined in advance for a reference hue of the image determined in advance based on a hue range of the image, and
wherein, in a case where the value of saturation at which the proportion of the black component reaches the minimum value is changed for a specific hue, for the hue between the specific hue and the reference hue, the processor is further configured to
change, in accordance with the hue, the value of saturation at which the proportion of the black component reaches the minimum value.

20. A non-transitory computer readable medium storing a program causing a computer to execute a process for information processing, the process comprising:
in accordance with a proportion of a black component with which to replace one or more non-black components that are color components other than the black component, replacing the one or more non-black components with the black component for an image, and
determine the proportion of the black component by brightness of the image and when saturation of the image varies in a saturation range from a first point to a second point, the proportion decreases from the first point to a minimum value of the proportion with increasing saturation of the image and increases with increasing saturation of the image after the proportion decreases to the minimum value of the proportion to the second point, wherein the first point indicates a point at which saturation of the image becomes zero for a value of brightness, the second point indicates a point at which saturation of the image becomes highest while the same value of brightness is maintained.

* * * * *